United States Patent
Grawrock et al.

(10) Patent No.: US 9,146,833 B2
(45) Date of Patent: Sep. 29, 2015

(54) SYSTEM AND METHOD FOR CORRECT EXECUTION OF SOFTWARE BASED ON A VARIANCE BETWEEN BASELINE AND REAL TIME INFORMATION

(71) Applicant: Intel Corporation, Santa Clara, CA (US)

(72) Inventors: David W. Grawrock, Aloha, OR (US); David Ott, Chandler, AZ (US); Corey Malone, Hillsboro, OR (US); Jesse Walker, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 147 days.

(21) Appl. No.: 13/722,158

(22) Filed: Dec. 20, 2012

(65) Prior Publication Data

US 2014/0181794 A1    Jun. 26, 2014

(51) Int. Cl.
*G06F 11/36* (2006.01)
*G06F 9/44* (2006.01)

(52) U.S. Cl.
CPC ............ *G06F 11/3636* (2013.01); *G06F 11/36* (2013.01); *G06F 11/3616* (2013.01); *G06F 8/70* (2013.01)

(58) Field of Classification Search
CPC .......................... G06F 11/3616; G06F 11/3636
USPC ...................................................... 714/38.13
See application file for complete search history.

(56) References Cited

U.S. PATENT DOCUMENTS

| | | | | |
|---|---|---|---|---|
| 5,257,358 A * | 10/1993 | Cohen | ........................ | 714/38.12 |
| 5,388,233 A * | 2/1995 | Hays et al. | .................... | 712/208 |
| 6,275,981 B1 * | 8/2001 | Buzbee et al. | ................ | 717/158 |
| 6,658,602 B1 * | 12/2003 | Nakano | ........................ | 714/38.1 |
| 7,194,608 B2 * | 3/2007 | Mericas | ........................ | 712/227 |
| 7,428,473 B2 * | 9/2008 | Rodriguez et al. | ............ | 702/185 |
| 7,844,828 B2 * | 11/2010 | Giraud et al. | ................. | 713/187 |
| 2005/0114839 A1 * | 5/2005 | Blumenthal et al. | .......... | 717/124 |
| 2005/0204155 A1 * | 9/2005 | Ravi et al. | ..................... | 713/200 |
| 2008/0040707 A1 * | 2/2008 | Araki | ............................. | 717/127 |
| 2011/0131452 A1 * | 6/2011 | Kumar et al. | .................. | 714/34 |

(Continued)

OTHER PUBLICATIONS

PCT International Application No. PCT/US2012/031303, filed Mar. 29, 2012, entitled "System and Method for Determining Correct Execution of Software", by Intel Corporation.

(Continued)

*Primary Examiner* — Gabriel Chu
*Assistant Examiner* — Paul Contino
(74) *Attorney, Agent, or Firm* — Trop, Pruner & Hu, P.C.

(57) ABSTRACT

In an embodiment a software application may include a "baseline trace" indicating proper application execution. The baseline trace may include counts for various types of instructions (e.g., how many times each of a LR instruction and a MV instruction occurs during an execution of code). The finished application includes the baseline trace. Upon execution the application randomly selects which of the various types of instructions to count during execution (e.g., LR or MV instruction) to produce a "real time trace". The application executes and produces the real-time trace. The baseline trace is then compared to the real-time trace, which is specific to the randomly chosen type of instruction. If the traces are within a pre-determined range of each other the user has a level of assurance the software is operating correctly. Other embodiments are described herein.

16 Claims, 11 Drawing Sheets

(56) References Cited

U.S. PATENT DOCUMENTS

2011/0172969 A1* 7/2011 Gara et al. .................... 702/186
2013/0254892 A1* 9/2013 Kaufman ........................ 726/24
2013/0262837 A1* 10/2013 Knauth et al. ................ 712/222

OTHER PUBLICATIONS

U.S. Appl. No. 13/631,317, filed Sep. 28, 2012, entitled "System and Method for Correct Execution of Software", by David W. Grawrock.

* cited by examiner

| Name | | Type | Description |
|---|---|---|---|
| TimeStamp | | Unsigned Integer (4 bytes) | Time stamp to sequence SVEN events<br>The SVEN HW adds the timestamp without any input from the software.<br>The SVEN HW uses the timestamp to sequence events in the buffer and external SW can use the value to sequence additional events like OMAR operations. |
| Event Tag | | Unsigned integer broken into bit fields (4 bytes) | The event tag identifies the source and type of event. |
| | GenCount | 2 bits | Identifies generation of structure |
| | Module | 9 bits | Module identifier<br>Software will normally translate this identifier into a text string |
| | Unit | 5 bits | Identifies instance of running software |
| | Type | 6 bits | Type identifies the major type of event associated with the module |
| | Subtype | 10 bits | Subtype identifies specific action inside the type |
| Instruction count | | Unsigned integer (4 bytes) | Instruction count, delta from last SVEN call |
| Payload | | 20 bytes Form determined by type and subtype | The combination of module, type, and subtype determine the structure of the payload. The structure can be any combination of elements that add up to 20 bytes. UINT, LONG, CHAR are all possible and there is no requirement that all elements be the same type |

FIG. 2

```
    Code Example                                    300
301 int FunctionA ()
302 {
303 DEVH_Func_Enter ("FunctionA")
304 //code does things with no use of any external services
305 ...
306 DEVH_Func_Exit (returncode)
307 Return returncode;
308 }

Expected Trace
    TS: 45.86 E:  Enter  N: FunctionA IC 2580
    TS: 00.02 E:  Exit  IC 1256
```

FIG. 3

```
    Code Example
401 int FunctionB ()
402 {
403 DEVH_Func_Enter ("FunctionB")

404 // do some code
405 ...
406 DEVH_Assert_Prior ("ExternalABC")
407 Call ExternalABC
408 DEVH_Assert_Post ("ExternalABC")
409 ...
410 DEVH_Func_Exit (returncode)
411 Return returncode;
412 }

Expected Trace 1
    TS: 45.86 E:  Enter  N:FunctionB  IC 2580
    TS: 45.86 E:  Prior  N:ExternalABC IC 1800
    TS: 45.86 E:  Post  N:ExternalABC IC 258900
    TS: 00.02 E:  Exit  IC 7820

Expected Trace 2
    TS: 45.86  E:  Enter  N:FunctionB  IC 2580
    TS: 45.86  E:  Prior  N:ExternalABC  IC 1800
    TS: 45.86  E:  Enter  N:ExternalABC  IC 8000
    TS: 00.02 E:  Exit  IC 250900
    TS: 45.86  E:  Post  N:ExernalABC  IC 258900
    TS: 00.02 E:  Exit IC 7820
```

FIG. 4

```
   Code Example
501 int Functionc ()
502 {
503 DEVH_Func_Enter ("Functionc")
504 DEVH_Assert_Loop("Start", count)
505 For (i=0;i<count;i++)
506 {
507    DEVH_Assert_Loop("Iteration", count);
508    // do some stuff
509    ...
510 }
511 ....
512 DEVH_Func_Exit (returncode)
513 Return returncode;
514 }

Expected Trace
   TS: 45.86 E:  Enter  N:FunctionC  IC 2580
   TS: 45.86 E:  Loop Start Count:10 IC 1800
   TS: 45.86 E:  Loop Iteration Count:0 IC 882
   TS: 45.86 E:  Loop Iteration Count:1 IC 460
   TS: 45.86 E:  Loop Iteration Count:2 IC 460
   TS: 45.86 E:  Loop Iteration Count:3 IC 460
   TS: 45.86 E:  Loop Iteration Count:4 IC 460
   TS: 45.86 E:  Loop Iteration Count:5 IC 460
   TS: 45.86 E:  Loop Iteration Count:6 IC 460
   TS: 45.86 E:  Loop Iteration Count:7 IC 460
   TS: 45.86 E:  Loop Iteration Count:8 IC 460
   TS: 45.86 E:  Loop Iteration Count:9 IC 460
   TS: 00.02 E:  Exit IC 7820
```

FIG. 5

```
   Code Example
601 int FunctionD ()
602 {
603 DEVH_Func_Enter ("FunctionD")
604 ...
605 DEVH_Assert (IF);
606 If (A>40)
607 {
608 DEVH_Assert (IF branch, ">40")
609 ...
610 }
611 Else
612 {
613    DEVH_Assert (IF branch, "not >40")
614    ...
615 }
616 DEVH_Func_Exit (returncode)
617 Return returncode;
618 }

Expected Trace 1
   TS: 45.86 E:  Enter  N:FunctionD  IC 2580
   TS: 45.86 E:  IF IC 1800
   TS: 45.86 E:  IF Branch >40 IC 220
   TS: 00.02 E:  Exit  IC 7820

Expected Trace 2
   TS: 45.86  E:  Enter  N:FunctionD  IC 2580
   TS: 45.86 E:  IF IC 1800
   TS: 45.86 E:  IF Branch not >40 IC 310
   TS: 00.02 E:  Exit  IC 6500
```

FIG. 6

```
   Code Example
701 int Functione ()
702 {
703 DEVH_Func_Enter ("FunctionE")
704 DEVH_Asssert_Resource(R1)
705 ...
706 Code accesses R1
707 ...
708 DEVH_Func_Exit (returncode)
709 Return returncode;
710 }

Expected Trace
   TS: 45.86 E:  Enter  N: FunctionE IC 2580
   TS: 45.86 E:  Resource V:  R1  IF IC 600
   TS: 00.02 OMAR R1
   TS: 00.02 E:  Exit  IC 7820
```

FIG. 7

```
    Code Example
801 int FunctionA()
802 {
803 DEVH_Func_Enter ("FunctionA")

804 // do some code
    ...
805 before = DEVH_Assert_Prior ("SystemCallXYZ")
806 Call SystemCallXYZ
807 after = DEVH_Assert_Post ("FunctionC")
808 assert (0.5*UsualSystemCallXYZTime < after – before AND
            after – before <= 1.5*UsualSystemCallTime)
    ...
809 DEVH_Func_Exit (returncode)
810 Return returncode;
811 }
```

FIG. 8

```
    Code Example 901 int FunctionB()
902 {
903 DEVH_Func_Enter ("FunctionB")

904 // do some code
    ...
905 before = DEVH_Assert_Prior ("FunctionC")
906 Call FunctionC
907 after = DEVH_Assert_Post ("FunctionC")
908 assert (ic = after - before)
    ...
909 DEVH_Func_Exit (returncode)
910 Return returncode;
911 }

912 int FunctionC()
913 {
914 DEVH_Func_Enter ("FunctionC")

915 // do some code
    ...
    ...
916 DEVH_Func_Exit (returncode)
917 Return returncode;
918 }
```

FIG. 9

```
      Code Example 1001  int FunctionD(Object)
1002  {
1003  DEVH_Func_Enter ("FunctionD")

1004  // do some code
       ...
1005  DEVH_Assert_Prior ("object.Function in whitelist")
1006  Call object.Function ()
1007  DEVH_Assert_Post ("ic = object1.FunctionInstructionCount OR
                         ic = object2.FuntionInstructionCount")
       ...

1008  DEVH_Func_Exit (returncode)
1009  Return returncode;
1010  }

1011  int object1:Function()
1012  {
1013  DEVH_Func_Enter (" object1 Function")

1014  // do some code
       ...
       ...
1015  DEVH_Func_Exit (returncode)
1016  Return returncode;
1017  }

1018  int object2:Function()
1019  {
1020  DEVH_Func_Enter ("object2 Function")

1021  // do some code
       ...
       ...
1022  DEVH_Func_Exit (returncode)
1023  Return returncode;
1024  }
```

FIG. 10

```
1401  static int foo()
1402  {
1403    Trace_Enter();

1404    LR AX, BX
1405    XOR AX, CX

1406    ...

1407    Trace_Exit();
1408  }
```

FIG. 14

```
1501  Enter foo 40
1502  Exit foo 437
1503    AR 12
1504    XOR 5
1505    MV 3

```
1601  instructionCount [A,B]
1602  MaxCount=number of items in instructionCount
1603  // fill in counts from baseline 1604  //select one
1605  Index = random(max(MaxCount))
1606  Type = instructionCount[index,1]
1607  Count = instructionCount[index,2]
```

FIG. 16

SYSTEM AND METHOD FOR CORRECT EXECUTION OF SOFTWARE BASED ON A VARIANCE BETWEEN BASELINE AND REAL TIME INFORMATION

BACKGROUND

Software may stop working correctly for several reasons including "malware" and "software rot." Malware is a source of problems on computer systems and it comes in a variety of forms with unlimited vectors of attack. Regardless of the form and vector, the end result of malware is that the original software does not work correctly. "Rot" (also known as "software aging") concerns the condition that after some period of time software stops working correctly. The reasons could be resource consumption, bugs, or transient hardware faults like stray energetic particles striking a chip. Whatever the reason for the rot, the end result is that the software stops working correctly.

BRIEF DESCRIPTION OF THE DRAWINGS

Features and advantages of embodiments of the present invention will become apparent from the appended claims, the following detailed description of one or more example embodiments, and the corresponding figures, in which:

FIG. 2 includes a schematic structure for a trace event in an embodiment of the invention.

FIGS. 3-7 include pseudocode that addresses expected trace outputs from various software architectures in various embodiments of the invention.

FIGS. 8-10 include pseudocode that concerns identifying unexpected software behavior and controlling the software, based on the behavior identification, in various embodiments of the invention.

FIGS. 14-16 include pseudocode that concerns identifying unexpected software behavior in various embodiments of the invention.

DETAILED DESCRIPTION

Figure 1:
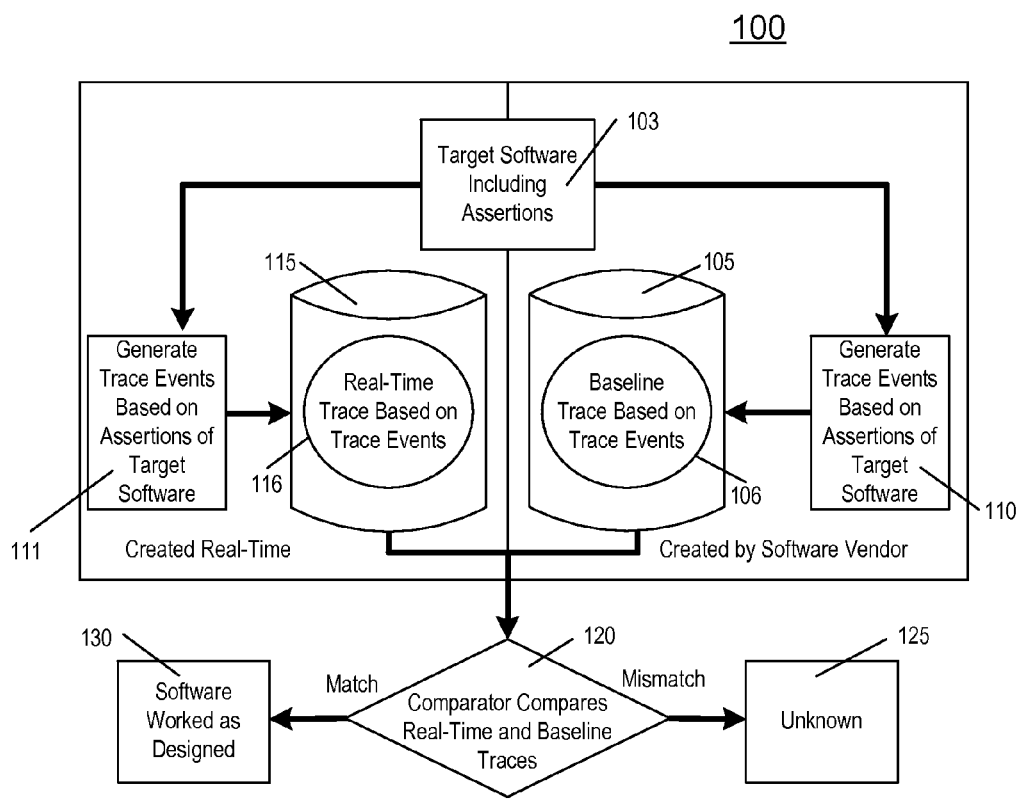
FIG. 1 includes a system for determining whether software is operating correctly in an embodiment of the invention.

In the following description, numerous specific details are set forth but embodiments of the invention may be practiced without these specific details. Well-known circuits, structures and techniques have not been shown in detail to avoid obscuring an understanding of this description. "An embodiment", "various embodiments" and the like indicate embodiment(s) so described may include particular features, structures, or characteristics, but not every embodiment necessarily includes the particular features, structures, or characteristics. Some embodiments may have some, all, or none of the features described for other embodiments. "First", "second", "third" and the like describe a common object and indicate different instances of like objects are being referred to. Such adjectives do not imply objects so described must be in a given sequence, either temporally, spatially, in ranking, or in any other manner.

Considering the wide ranging forms of malware and rot, the software community faces challenges in ensuring (wholly or partly) that a piece of software executes correctly. While it is possible to ensure the correct loading of the software (e.g., through features like Intel® Trusted Execution Technology), there is a challenge in obtaining reliable information regarding the actual execution of that software, after it has been loaded, and then acting on that information immediately or quickly after obtaining the information (so as to limit the damage from rot, malware, and the like).

An embodiment provides a level of assurance regarding correct operation of software. Some embodiments further provide mechanisms to stop or contain execution of software that fails to have a sufficient assurance of correct software operation. An embodiment creates baseline and real-time measurements of software and compares the measurements to determine whether the software is operating correctly. An application provider may include "tracing elements" (also referred to herein as "assertions") in a target software application. While producing, developing, testing, shipping or otherwise working with the application the trace elements are detected and provide trace events (e.g., instruction counts (ICs)), which collectively provide a "baseline trace" indicating proper application execution. The provider then supplies the application, which still includes the trace elements, and the baseline trace to a user. The user operates the application in real-time to produce a "real-time trace" based on the application still having trace elements that produce trace events (which collectively form the "real-time" trace). A comparator then compares the baseline and real-time traces. If the traces are within a pre-determined range of each other the user has a level of assurance the software is operating correctly. If the level of assurance is low, an embodiment may trigger a hardware interrupt to prevent further execution of software that is not performing in an expected manner. Other embodiments are described herein.

While embodiments use ICs to provide this level of assurance, other embodiments provide the assurance based on other metrics such as, for example, a ratio of one type of instruction to other instructions included in a routine, the presence of certain types of calls (e.g., calls of varying security levels such as calls for a ring 0 resource), and the like.

This level of assurance has many applications such as, for example, malware detectors and attestation providers for use by corporate information technology (IT) groups and users of all kinds. More specifically, this level of assurance has applications with password processing (e.g., assurance that password data is only accessible to, and in use by, the password processor), online banking (e.g., assurance that the only software process dealing with the user's bank account information is the authorized bank software), online gaming (e.g., assurance that an individual is not cheating and the supplied software is executing the game correctly), digital rights management (DRM) (e.g., assurance that the enforcement of the DRM rules is occurring in the DRM software), health records (e.g., assurance that the authorization around access to the health records is followed according to the appropriate policies), financial software (e.g., knowledge that both transfers and automatic trading are happening correctly), cloud computing (e.g., assurance that the software necessary to run the cloud application is running correctly), and the like.

Furthermore, this level of assurance (or more generally, an indicator that software is performing in an unexpected way for some reason) can be leveraged so that software, once identified as performing in an unexpected way, can be quarantined and/or its execution can be halted.

FIG. 1 includes a system for determining whether software is operating correctly in an embodiment of the invention. System 100 combines two processes: (1) trace collection, and (2) a comparison between a real-time trace and a baseline trace. For instance, a software provider (e.g., software developer and/or someone with access to source code) instruments "target" software 103 (sometimes referred to herein as code, application, and the like) to generate trace events (using trace elements or "assertions" embedded in code) in block 110 and then, from the generated trace event or events, creates baseline trace 106 (stored in buffer 105) when, for example, the software is ready to ship to users. After shipping, the real-time running or executing software generates trace events (using trace elements or assertions still embedded in the shipped software) in block 111 to generate real-time trace 116 (stored in buffer 115) collectively formed from the trace event or events. A comparison function (referred to herein as a "comparator") then compares real-time trace 116 to baseline trace 106 in block 120 and if the traces match within a predetermined acceptable amount, a user may have a level of assurance software 103 is executing as the vendor expected it to (130). Otherwise the user has no such assurance (125). Embodiments described below (e.g., FIG. 11) address how hardware may be used (e.g., hardware interrupts) to stop software execution when the user has inadequate assurance of proper operation.

The mechanisms for generating trace events are varied. In one embodiment a system such as the System Visible Event Nexus (SVEN) is used. SVEN is a hardware mechanism (available at the time of filing at, for example, www*videoncentral*com) that enables the creation of the traces. In an embodiment SVEN is in use both by the software vendor to create the baseline trace (blocks 110 and 106) and the real-time trace (blocks 111 and 116) when desiring to gain assurance of correct operation. SVEN processes the assertions to generate SVEN events that collectively form a trace in SVEN buffer 105. For SVEN to operate, software 103 may include SVEN assertions. The vendor or any other party compiles the assertions into code 103 and they remain present even on production releases. The SVEN assertions (blocks 110, 111) may generate SVEN events that follow a fixed format such as that found in FIG. 2 (discussed further below). Software 103 asserts a SVEN event (blocks 110, 111) and the nexus collects the event and puts it into the buffer (buffer 105 when concerning the baseline trace and buffer 115 when concerning the real-time trace).

Buffers 105, 115 may be circular buffers that allow for the constant input of SVEN events. Buffers 105, 115 may include integrity protection to ensure that only SVEN places items into the buffers. It is possible due to threats to exposure of sensitive data that the reading of the buffer requires protection.

In one embodiment buffers 105, 115 may be included in "stolen physical memory", wherein a BIOS would reserve the stolen memory area and indicate, through range registers, the location. The range registers would enable the hardware protection of only SVEN writing to the buffer. An embodiment may require that SVEN be the only agent capable of writing to the buffer.

SVEN may create buffers 105, 115 of information one event at a time. The events may be 32 bytes in size and the content may be event specific. FIG. 2 shows an example layout of SVEN event 200. Of note, the "instruction count" (IC) includes a count of instructions that have transpired since the last SVEN call. Also, note the "TimeStamp" entry which allows for the sorting of SVEN events into an ordered stream of events. The timestamp is sufficient for ordering and may be used as a trace, instead of the IC, in some embodiments. However, in other embodiments the IC establishes the trace value. Also, SVEN event 200 may include, as part of the header, the IC for the thread that initiates the SVEN event. Just as the software has no control of the timestamp, the software may have no control of the IC. In an embodiment, the SVEN event size is 32 bytes.

In an embodiment the IC includes various properties concerning a single thread (e.g., the IC is from the initiating thread only and no other execution thread influences the count), no interruptions (e.g., the IC does not include any instructions from ring 0, secure mode management (SMM), or any other interrupt service), and no load influence (e.g., if other operations are occurring on the device, the IC does not change in response to the increased load).

Embodiments may "instrument" (e.g., embedding trace elements or assertions) in various applications. For example, an embodiment may instrument "input parsers", which may cause security problems and are therefore good candidates for instrumentation. Incorrect handling of input allows attackers to insert malware into the application. A properly executing parser drastically reduces the ability of malware to insert information into the application. Thus, embodiments can provide evidence of correct parser execution. If embodiments can detect incorrect behavior doing so would allow the application to better defend itself from malware.

An embodiment may be used to instrument "heartbeat applications". Such applications check, at regular intervals, for evidence of specific conditions. One example is the heartbeat application that regularly checks for the execution of an anti-virus (AV) program. If the heartbeat application does not detect the AV application, the heartbeat application informs the user, management consoles, and the like regarding the lack of AV execution detection. Such instrumentation may allow one to determine the health of the heartbeat application and whether the program is working correctly.

An embodiment may focus on detecting software rot. Rot can occur in various sections of a program. Instrumentation could be performed in key areas or portions of programs or throughout such programs.

Other areas for instrumentation include cryptographic functions and the like.

While several of the above passages discuss instrumenting software to produce baseline and real-time traces (and instrumentation will be further addressed in regards to FIGS. 3-7), attention momentarily turns to how those values are compared. The software application for conducting such a comparison (referred to at times herein as a "comparator" in block 120 of FIG. 1) may come paired with target software 103. In an embodiment the traces resulting from properly instrumented and defined software will not reveal information on keys or other such sensitive data. Thus, the production and exposure of the baseline and run-time traces need not be access protected (but can be in other embodiments). Also, in an embodiment there is no restriction on the use of the comparator of block 120 so the comparator can work without any authorization. This may simplify the code of the comparator and the distribution of the comparator. In an embodiment the comparator has access to the baseline and runtime traces but does not require write access to either of the traces. In an embodiment, the comparator may be precluded from writing to any buffer related to either trace (e.g., buffers 105, 115). In an embodiment the comparator may have functionality to validate the integrity of either flow but in other embodiments the comparator has no such capability.

Regarding baseline trace 106, the baseline trace may be provided by the software provider (e.g., the software programmer, distributor, or user of the software). The baseline trace represents the execution of a correctly functioning program. As mentioned above, in some embodiments comparator 120 does not validate the providence and integrity of baseline trace 106. However, in such an instance the software provider may provide a digital signature on the baseline trace that will enable callers of the comparator to validate the providence and integrity of the baseline trace 106. In some embodiments entities other than the software provider may create baseline traces (e.g., when software runs in a special environment that makes the creators baseline trace inaccurate).

In an embodiment comparator 120 is not involved in the collection of runtime trace 116. The comparator does not validate the providence or integrity of the runtime trace. Instead, the caller of the comparator is responsible for validating the providence and integrity of the runtime trace in some embodiments. In an embodiment the ecosystem that collects real-time trace 116 and submits it to the comparator must correctly match a runtime trace to a baseline, validate the integrity of both baseline and runtime, and then disseminate the comparator report.

In an embodiment comparator 120 may work online and/or offline. In the online mode, the comparator monitors the real-time trace and responds "as soon as possible" to a detected anomaly. In offline mode, the comparator reviews a previously recorded real-time trace and delivers a verdict if the trace did or did not match. In an embodiment the comparator may compare two traces stored in two buffers (e.g., buffers 105, 115) or even a single buffer. The buffers may be static or dynamic buffers. The comparator may operate on the same platform or a different platform from the platform that collected the runtime trace. In an embodiment the comparator (e.g., offline comparator) may operate as a ring three application (based on a privilege ring hierarchy where lower layers or rings are more privileged).

However, in some embodiments (e.g., online comparator working synchronously with the collection of the runtime trace) comparator 120 may execute in a special environment. Such an environment may allow, for example, the comparator to safely notify a management console without interception or perform a new load of the application without rebooting the platform. In such a case the comparator may be isolated from target software 103. For example, the comparator and the target software may run in different address spaces which may be completely separate from each other. Examples would include two ring three processes or two separate virtual machines (VMs) respectively for comparator 120 and target software 103. When the target software is a base component (e.g., ring 0 or a virtual machine monitor (VMM)), the architecture may provide a place for the execution of the comparator.

In an embodiment, comparator 120 may have access to runtime buffer 115. As the target software is continually filling the buffer with additional events (e.g., outputs due to encountering instrumented trace elements or assertions), the comparator may read the buffer and compare the real-time trace to the baseline trace. The comparator's access to the buffer may be such that neither the target software, nor other software such as malware, can interfere with the comparator's buffer access (e.g., due to use of an isolation mechanism that isolates access to the buffer to only specified functions). Also, the comparator may have read access to the buffer but any write access may be mitigated by the architecture. Thus, in an embodiment only certain entities (e.g., SVEN hardware) may write an event (e.g., a SVEN trace event) to the buffer.

In an embodiment target software 103 is made unaware (e.g., via virtualization) of when the comparator performs a comparison. In embodiments where the comparator operates on a schedule, any scheduling occurs outside of the purview of the target software.

In an embodiment, the comparator (e.g., 120) may do a direct comparison between two traces to produce a "yes" or "no" answer regarding whether the traces match. However, in other embodiments the comparator may produce results that lead to a "confidence level". For example, the comparator may yield a "complete" rating for ICs that are perfect matches, "high" for ICs that are within 10% of each other, and "low" for ICs that deviate from one another by more than 10%. Any report may be subject to security (e.g., digital signatures) and the like.

Further, comparator 120 may operate within an isolated environment (e.g., Trusted Platform Module) that provides a protected execution location. The execution guarantees the ability to operate without interference. This guarantee provides the location to execute the comparator such that the comparator is isolated from all other platform processes.

FIGS. 3-7 address expected trace outputs from various software architectures. In an embodiment, these outputs generate the baseline and real-time traces 106, 116 that are compared via comparator 120. The expected traces only show a filtered amount of information for ease of explanation but in some embodiments typical header information may still be present in each event.

FIG. 3 includes "straight code" with a function that only uses software assertions with no associated hardware trace data. Lines 303 and 306 indicate inserted trace event invoking "assertions" (see "DEVH" entries). In other words, these "assertions" collectively generate baseline and real-time traces 106, 116 when execution of the code interfaces those assertions. As a result of the two different assertions at lines 303, 306, and the fact that "straight code" (e.g., no loops) is at issue, there are only two expected trace events at timestamps (TS) 45.86 and 00.02. As indicated above, in various embodiments ICs are used that show the "delta" or instruction count change since the last assertion. In the case of FIG. 3 there are ICs of 2580 and 1256. A comparator would have this information as a baseline trace. A real-time trace would then be generated (110, 106) and compared (120) with the baseline trace. With no external hardware use, the code of FIG. 3 should run the same way every time so the IC at the exit should be a constant value. The entry IC may differ, as it will depend on how the function is called. The comparator should see little variability in the IC values and should judge accordingly (e.g., "complete", "high", "low" levels of integrity). Even the enter IC should be close to the same.

FIG. 4 includes "straight code" with external service. This type of function has no control flow changes but does call an external service. In this example there are four trace assertions at lines 403, 406, 408, 410 and there are four corresponding trace events. However, there are two different expected traces: "Expected trace 1" and "Expected trace 2". Specifically, this is a straight compare. The sequence must be present or the function did not execute properly. The external function ("ExternalABC") may, or may not, have assertions. The "Expected trace 1" shows the result when the external function does not have assertions. The "Expected trace 2" shows the result when the external function does have assertions (e.g., SVEN assertions). In "Expected trace 1" the post assertion shows a count of 25890 that includes the overhead for the function call and all of the operations performed by "ExternalABC." In "Expected trace 2" the post assertion shows the same value (258900) but the internal operations show the breakdown of those instructions. The post processing could have just as easily displayed the delta from the exit of "ExternalABC". Either way there is the same number of instructions.

FIG. 5 includes code with a loop. Loops are common in code and provide a way to perform the same operation repeatedly. Loops are also one area where attacks commonly occur due to mistakes such as buffer overflows. In this example there are assertions at lines 503, 504, 507, and 512 but there are more than four trace events due to the loop. In an embodiment if the code asserts the number of iterations to look for, the baseline trace will provide the instruction count for a single iteration and the comparator can ensure that each iteration uses the correct number of instructions. If the loop includes early out checks, that path through the code may also provide trace assertions. If the loop count runs over, that is direct evidence of an issue indicating the code did not operate correctly. Notably, in FIG. 5 the IC is larger for count 0 than the remaining iterations. In this case the first iteration of a loop counts the instructions that precede the loop and the setup of the loop constructs. All subsequent iterations of the loop count the instructions from the bottom of the loop back to the top. This explains the different ICs for count 0 versus the other iterations.

FIG. 6 includes code with an IF statement that allows the code to make a decision. There are assertions at lines 603, 605, 608, 613, and 616. The comparison is somewhat more complex due to the variance necessarily brought on by an IF statement. Depending on the complexity of the code a software provider may wish to only instrument various portions of the IF related code. If the code path is addressed and stored as a baseline trace then the intertrace compare is straight forward. However, if the code path is not in the baseline the comparison may return a verdict of "unknown". Various embodiments may handle branches in various ways. For example, an embodiment may place a branch indicator in the target code along with additional assertions to indicate which branch is taken. Another embodiment may create a baseline such that the baseline knows about both paths and the comparison has a way to select either path.

An embodiment includes detecting malware activity based on the malware executing a number of instructions that exceeds an instruction count extending from the first baseline trace event to the second baseline trace event; wherein the malware is at least partially included in the application between the first and second assertions. As a result, the embodiment limits the computational power of malware. For example, if malware wants to hide from detection the malware must operate within the number of instructions between two trace events. Thus, the malware has a computational limit to the amount of work that is possible between two trace events.

FIG. 7 includes code with hardware interaction. The code has assertions at lines 703, 704, and 708. Here the hardware interaction is for hardware resource R1 (e.g., a register). This example shows an embodiment combining trace data (e.g., SVEN data) with OMAR hardware interactions. OMAR is a silicon feature (e.g., included on some Intel® consumer electronics platforms) that efficiently collects traces of hundreds of internal system on a chip (SoC) signals into host memory. The trace assertions indicate which resource the code will access. The resulting trace contains the identification and use of the resource. The comparison is straight forward and may include pre and post assertions to keep track of when the resource access occurs.

In an embodiment a routine or software portion that should have little to no variance in IC delta may require a 100% match to allow for further execution. However, in more complex software portions where some IC delta variation may be expected a less than 100% match may be tolerable for continued software execution. Thus, the "standards" for allowance may change routine to routine to allow for greater granularity.

The above description regarding FIGS. 3-7 has focused on several embodiments that use IC to determine a level of assurance as to whether software is executing in an expected manner (e.g., expected execution flow). More specifically, above described embodiments use various mechanisms to generate a baseline, which, for example, allows a comparison of a real-time trace to a baseline trace. When mismatches are found there is evidence of incorrect operation.

Attention now turns to embodiments (and related figures) focusing on additional ways, beyond IC monitoring, to determine a level of assurance as to whether software is executing in an expected manner. Further, some embodiments enlist ways to stop or quarantine software that has been identified as behaving in an unexpected way (or that is behaving in an unexpected way regardless of whether that unexpected behavior has truly been identified). Some embodiments described below take the baseline concept and include baseline data (e.g., ICs) in baseline metadata, which can be used to control software behavior. Such embodiments provide software with limits, enforced by the hardware, which prevent behavior not anticipated by the software developer.

More specifically, embodiments use baseline data (e.g., ICs) to control hardware. As noted above, baseline data may contain the minimum and maximum number of instructions allowed between two trace events. An entity may come along, after the software has executed (e.g., possibly seconds, hours, or days after the execution), and inspect the real-time trace to validate that the instruction count fits into the specified range set out in the baseline data. Embodiments described below include the ability for hardware to set an interrupt, or some other control mechanism, and if the expected event does not occur within the specified range (e.g., IC range, white-listed calls, and the like) invoke the interrupt and stop program execution.

An embodiment includes a process whereby a baseline trace is included in an executable along with hardware hooks that enforce baseline behavior. An embodiment includes (1) instrumenting software with trace events, (2) creating a baseline (e.g., baseline trace with ICs), (3) attaching the baseline data to an executable (e.g., via a linker), (4) running the software, (5) on each trace event loading parameters from the baseline (attached to the executable) and "setting hardware triggers" in response to the baseline information (i.e., configuring the hardware to trap when the actual execution path does not match the expected path), and (6) stopping execution of the software if any of the triggers "fire" (execute).

The hardware triggers provide a way of controlling software. Anti-virus and other such controls are "generic" and not specific to the executable (unlike baseline data based embodiments described above). Thus, anti-virus software does not always handle new vectors of attack. The anti-virus control and many other controls look for known signatures of bad behavior as opposed to requiring an anticipated flow (e.g., based on baseline data) and controlling software and hardware (e.g., via hardware interrupts) if that anticipated flow is not seen. In other words, various embodiments described herein are not linked to a predetermined vector and instead more generally scout for unexpected behavior (regardless of whether that vector is present in a previously analyzed signature).

More specifically, in an embodiment the captured baseline information provides metadata that is used to control the execution of a program with operational restrictions. For instance, the baseline data includes the minimum and maximum number of instructions that should occur if the program is executing correctly. By seeding the hardware with the information from the baseline, an embodiment sets a hardware trigger, such as a hardware interrupt, so if the next event expected by the baseline does not occur within the minimum/maximum IC range, the hardware generates an interrupt. This interrupt halts current execution and allows a policy decision regarding the failure to follow the correct program path.

FIG. 8 includes pseudocode that concerns identifying unexpected software behavior and controlling the software based on the behavior identification. In FIG. 8 a known number of instructions is required to execute SystemCallXYZ. The real time trace is expected to show a SystemXYZ "post" trace event (line 807) immediately after the SystemXYZ "prior" trace event (line 805). If a different IC delta occurs, or if a different real time trace occurs, a monitor knows unexpected behavior occurred. More specifically, assertions are included at lines 803, 805, 807, and 809. Lines 808 and 809 refer to a value "after–before", which creates an IC delta based on the assertions at lines 805 and 807. If the IC delta falls within the bounds of: 0.5*UsualSystemCallXYZTime (which actually relates to an IC and not a time) and 1.5*UsualSystemCallTime; then no interrupt occurs. However, if the IC delta falls outside those bounds then the "assert" command (or similar commands) generates a trap to the operating system via a hardware interrupt. The interrupt may then be processed by an interrupt handler. The handler servicing the interrupt decides whether to continue or to discontinue the software execution based on its own policy and the measured variance reported by the interrupt. Various other commands that trap to a handler and the like may be used in other embodiments.

FIG. 9 includes pseudocode that concerns identifying unexpected software behavior and controlling the software based on the behavior identification. The embodiment of FIG. 9 expects the real time trace to contain a FunctionB prior assertion, then a FunctionC prior assertion, then a FunctionC post assertion, followed by a FunctionB post assertion and that the number of instructions between the prior/post pairs is known. If a different trace occurs (e.g., FunctionC post assertion does not immediately follow FunctionC prior assertion), or if a different number of instructions is counted by the hardware than the expected IC delta, then unexpected behavior may be present. More specifically, the pseudocode includes assertions at lines 903, 905, 907, 909, 914, and 916. ICs should be generated at "FunctionB prior" (or thereabouts such as line 903), the prior/post assertions for FunctionC respectively at lines 905 and 907, and then again by a FunctionB post (or thereabouts such as line 909). If FunctionC (lines 912 to 917) functions in an expected manner, then the IC delta between elements such as FunctionB prior and FunctionB post should produce an IC delta that can be compared to baseline data. Other IC deltas may be examined as well and may include sequential assertions (IC delta between lines 907 and 905) but may also include IC deltas in non-sequential assertions (IC delta between lines 907 and 903 or between lines 914 and 907). In the example of FIG. 9, there is an assert command at line 908 that compares a known value ("ic") to an IC delta between lines 905 and 907. If there is a match the software continues execution. Otherwise, an interrupt is generated to be processed by a handler.

The embodiment of FIG. 9 may be effective in combating Return Oriented Programming (ROP) attacks, which include malware where an attacker uses control of the call stack to indirectly execute selected instructions immediately prior to the return instruction in subroutines within the existing program code, in a way similar to the execution of a threaded code interpreter. Thus, "RET" code instructions (e.g., lines 910 and 917) in FIG. 9 are "protected" or traced with assertions at lines 909 and 916. The extra commands of the ROP attack could be determined based on the IC delta tracking discussed above.

FIG. 9 may be thought of as a hardware interrupt that tracks the ratio of "RET" instructions to other instructions. As indicated above, this ratio can be an indication of a ROP attack. However, the ratio can instead be an indication of a more computationally complex construction, such as a recursive look ahead parser (e.g., YACC) or an interpreter for a Turing complete language (e.g., SQL or HTML 5.0), where baseline behavior necessarily becomes less prescriptive due to computational complexity. With one ratio being indicative of attack (ROP) and the other being indicative of correct execution (e.g., YACC), a simple single ratio for all functions would result in too many false positive and negatives. However, if the baseline data includes the ratio and sets the ratio for the current function (e.g., for FunctionC of FIG. 9 instead of all functions), the hardware can distinguish between benign and malicious ratios.

FIG. 10 includes pseudocode that concerns identifying unexpected software behavior and controlling the software based on the behavior identification. In FIG. 10, when a developer creates software there are numerous types of calls such as static and dynamic calls. Static routines are permanently associated with the executable. Dynamic routines, however, require dynamic linking during execution. What does not change is that the name of the routine is prior knowledge and that the linker or loader will resolve the address of the called function. An embodiment includes a white list of known functions that a routine will call. The baseline may include the white list and when starting execution of a routine or software portion (e.g., at a STP_Entry event for the start of a routine), load the white list into hardware registers designed to encode the expected baseline behavior. Throughout the execution of the function or routine, or until the associated exit (e.g., at a STP_Exit event for the end of a routine), the only calls that are permissible are ones in the baseline white list. Any calls to functions not on the white list result in an interrupt and the need to enforce some policy. Specifically regarding STP_Entry/Exit instructions, these instructions are programmer added events that indicate the entry and exit into a function. These commands invoke the addition of those events into a trace buffer. The inclusion of these events may be done by a compiler or the programmer directly.

More specifically, FIG. 10 includes an object-oriented programming example, where one of a family of related functions is called depending upon the object and the type of the object. In an embodiment the white list consists entirely of the related family of functions. Here a trace should consist of the FunctionD prior assertion (or thereabouts such as line 1003), followed by the prior assertion for either object1.Function or object2.Function (line 1007), depending on whether the object is of type object1 or of type object type2. If a different prior statement occurs, then the call is not on the white-list and something interesting has likely happened (i.e., the assurance level for proper software execution has decreased). In FIG. 10, if object1.Function is called then in line 1007 an assert command compares a known value ("ic") for object1.Function to an IC delta between lines 1105 and 1107. If object2.Function is called then in line 1007 an assert command compares a known value ("ic") for object2.Function to an IC delta between lines 1105 and 1107. If there is a match (complete match or within a threshold level of satisfaction)

the software continues execution. Otherwise, an interrupt is generated to be processed by a handler. If neither object1.Function nor object2.Function is called, then the assert command issues an interrupt. Thus, functions not on the white-list (or adulterated white list functions) are detected and stopped.

Other examples used to control software execution are included in various embodiments. For example, a goal of malware may be to corrupt a ring 3 process and use the corruption to gain access to ring 0 resources. This represents a privilege escalation and, while not always present, is a goal for many types of malware. The baseline data can include metadata that indicates if the code includes a SYSCALL or not. If the code indicates that there is no SYSCALL and a SYSCALL occurs, the hardware may issue an interrupt and allow some policy to determine the next steps. This is an example wherein control is not necessarily based on ICs or delta ICs but instead is based on other metrics. The metrics may be, for example, based on non-IC based knowledge about the software architecture (e.g., that a SYSCALL could not have been made from a certain part of the program if the software were operating correctly) rather than on IC delta as described in several embodiments above.

For the embodiments of FIGS. 8-10, the DEVH_Func_Enter and DEVH_Func_Exit are part of a compiler. Thus, when code is compiled the compiler inserts those calls. For example, after instrumenting the software to generate trace events, the developer may then run the program to create the baseline. The process may take a statistically significant number of runs, combine the output from those runs and determine the instruction minimum and maximum and other such metadata (e.g., what calls are made and what calls should not be made). The developer may then take the resulting baseline and include the baseline data as part of the executable delivered to customers. When the software executes, the software references the baseline metadata and uses the data to set the hardware options. The link between the binary executable and the baseline metadata may come, in one embodiment, from an ID number associated with the STP_Entry (or STP_Exit) command in the source code. Each invocation has a separate ID number and a linker can create a "fixup marker" that enables the running code to link to the baseline metadata included in the file.

The link between the binary executable and the baseline metadata is now discussed more fully. An embodiment may include a main program and many libraries, such as dynamic link libraries (DLLs). The DLLs are basic services that are shared among many programs. When the main program is loaded, the operating system (OS) consults a table of "separate ID numbers" to identify all the DLLs required to run the program. The OS then patches the DLLs into the appropriate location of the calling program, so calls for these services go to real DLLs instead of dropping into random memory locations (where there may or may not be any code that can service the call). This process may be referred to as "late binding" or "run-time binding". The programmer might not even know which DLLs his or her program uses, only the services that the program needs.

An embodiment described above references a link between the binary executable and the baseline metadata via an ID number associated with the STP_Entry/STP_Exit command in the source code. In an embodiment, this executable/metadata "link" follows the DLL link model. For example, in one embodiment each DLL (or some DLL(s)) itself includes the necessary markers and its own pre-computed baseline execution information (referred to herein as "metadata"). The metadata from the DLL can then be combined with that from the main program to compute the baseline execution. Since the programmer may not know which DLL will be linked to his or her program, the actual expected execution sequence has to be unknown before this patching of program to particular DLLs and so cannot be known until the program is loaded into memory for execution. Hence the real baseline may be computed when the program is loaded to run.

Figure 11:
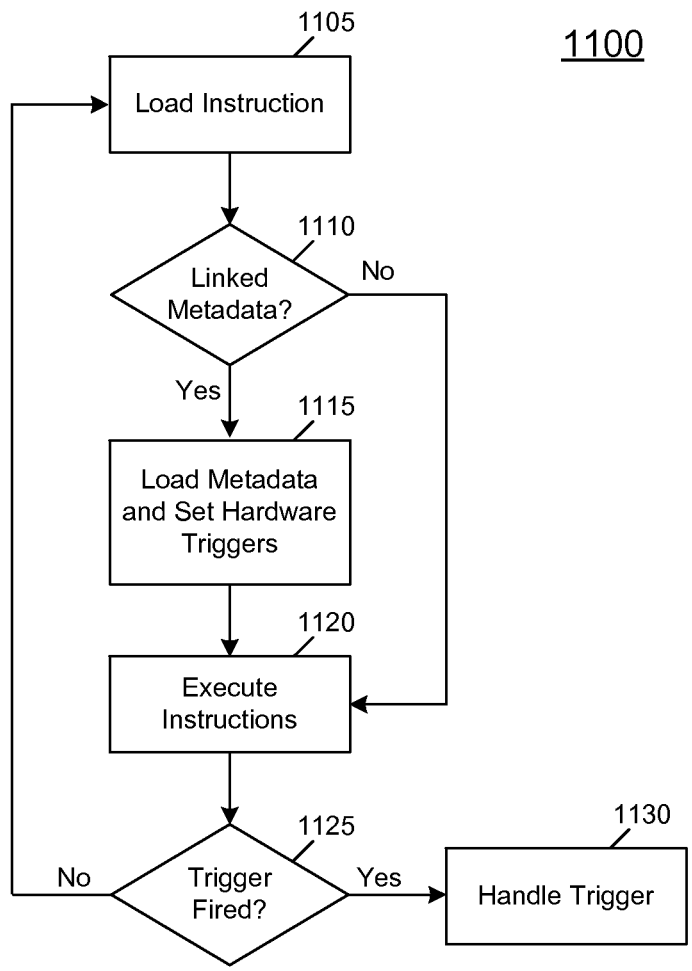
FIG. 11 includes a method for controlling software execution in an embodiment of the invention.

FIG. 11 includes an embodiment involving process 1100 for control of software via hardware mechanisms. In block 1105 an instruction is loaded. Block 1110 determines if that instruction is linked to baseline data, such as metadata having IC information for the routine of which the instruction is associated. If there is no such information, the process advances to block 1120. However, if there is such information then in block 1115 the metadata is loaded and hardware triggers are enabled. In block 1120 the instructions are executed and, for example, ICs are generated and compared to baseline values. Based on the results of block 1120, block 1125 may fire a hardware trigger (e.g., a hardware interrupt) if, for example, an IC delta did not meet certain thresholds. In block 1130 a handler may then handle the triggered event (e.g., interrupt).

Figure 13:
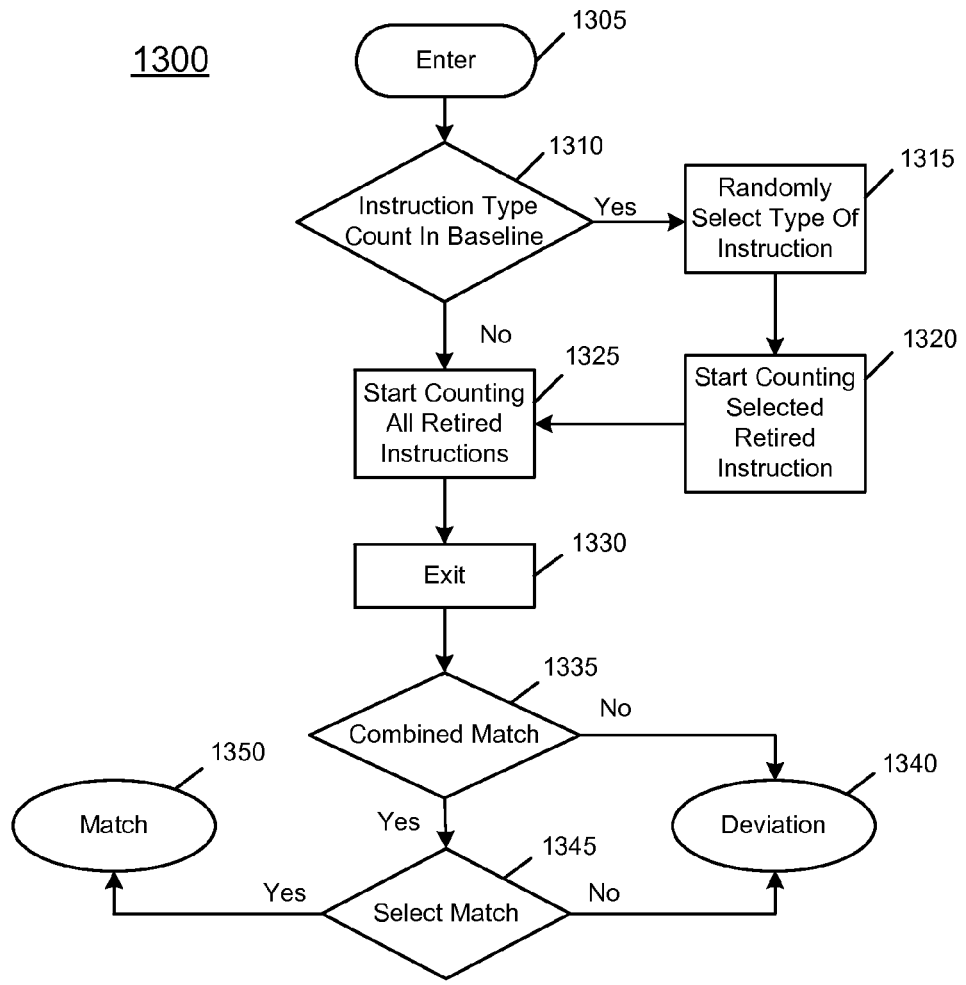
FIG. 13 includes a method for controlling software execution in an embodiment of the invention.

Another embodiment includes mechanisms to further frustrate malware, ROT and generally promote proper software execution. FIG. 13 includes a method for controlling software execution in an embodiment of the invention. FIGS. 14-16 include pseudocode that concerns identifying unexpected software behavior in various embodiments of the invention. Those figures are now discussed.

An embodiment addresses a situation where an attacker may know software includes a process that will compare the run-time trace to the baseline trace. Such an attacker may attempt to hide malware such that execution ICs still match baseline ICs. For example, an attack may attempt to modify code between trace events in a manner that is not detected. As mentioned above, one mechanism to combat this attack is to count the number of instructions retired and include the IC in the baseline. However, now the attacker has an upper limit on the number of subverting instructions the attack can use. While the attacker cannot use more than the number of instructions, the attack can still use fewer instructions and then pad the number of instructions to match the baseline IC. This type of attack may fully or partially subvert IC based embodiments, some of which may be addressed above.

However, an embodiment addresses such attacks by using measurement activities in the baseline and selecting, possibly in a random fashion, one or more of the measurements for validation. In such a situation an attacker cannot simply add random padding because the attacker must meet all of the requirements, some of which may be randomly selected before, during, or after execution. The random selection of metrics keeps measurement perturbation low while still providing security assurance.

An embodiment counts select retired instructions by type and, in some embodiments, randomizes baseline validation. Counting retired instructions by select type may constitute a subset of the complete retired instruction count, which may include all instruction types. While it is possible to count all of the instruction types in use between measuring events, the overhead of such counting may be prohibitive or at least undesirable. While some embodiments do engage in a complete accounting of all instructions between measuring events, other embodiments do not in order to reduce overhead. Instead, an embodiment computes a count of selected instruction type or types in addition to or instead of the total number of instructions retired. This information may be included in the baseline information (e.g., metadata). At runtime, an embodiment randomly picks one of the type counts and, when performing the compare, checks the total count and/or the selected type count. Any mismatch indicates a deviation from the baseline and, as explained above, an interrupt may be issued and the software may be halted, quarantined, and the like.

In FIG. 13 block 1305 begins process 1300. In block 1310 a determination is made regarding whether the baseline information includes IC information segregated by, for example, instruction type. For example, instruction types may include LR (load register), AR (add register), MV (move one location to another), XOR (Boolean logic command), among many, many other types of instructions. This determination may be based on linking provisions addressed above in conjunction with other embodiments.

FIG. 14 includes example code for analysis. Line 1401 concerns a generic function used for exemplary purposes. The code trace begins at line 1403 and ends at line 1407. Within the trace various commands (LR, XOR) are shown for illustration but many other commands may be inferred to be included in the " . . . " of line 1406. As shown in FIG. 15, the baseline information shows AR instructions counted 12 times, XOR instructions counted 5 times, MV instructions counted 3 times, and so on. Lines 1501 and 1502 concern the entire instruction count for the code of FIG. 14.

If such instruction type-specific information is present in the baseline data, in block 1315 an embodiment randomly selects a type of instruction for scrutiny based on the real time trace to be generated. This selection may not necessarily be random, but in the present embodiment being discussed the selection is random and may be used in cooperation with a random number generator (RNG) component of processor 1270 of FIG. 12. As shown in FIG. 16, line 1605 addresses random selection of an instruction type for analysis. However, in other embodiments the type may be picked based on, for example and without limitation, the baseline count that is highest, lowest, and the like. For example, focusing on the count that is lowest may provide less room for an attacker to work within (e.g., it may be harder for an attacker to circumvent an MV count of 3 than an AR count of 12).

Once an instruction type is selected, in Block 1320 an embodiment may start executing the software and counting the selected instructions between measuring points (as opposed to counting all instructions, which may be computationally expensive).

In block 1325 all instructions may be counted. In one embodiment, this is in addition to block 1320 and also occurs if the determination is "no" for block 1310. However, in other embodiments block 1320 may bypass block 1325 and move directly to block 1330.

In block 1330 an exit is performed. In Block 1335, assuming both a specific instruction type count was performed as well as total IC was performed, the total IC may analyzed against baseline data and any deviation from expected results may be addressed in block 1340. If there is a match with expected behavior, in block 1345 an analysis regarding a instruction type specific count may be analyzed against baseline data. A deviation from expected results is addressed in block 1340 and a match is addressed in block 1350, where normal software operation may be permitted to continue, resume, and the like.

In other embodiments, again, a total instruction count may be avoided and block 1302 may advance to block 1330, which may then proceed directly to bock 1345. Also, as shown in earlier embodiments described above, instruction type specific counts may be avoided altogether.

In an embodiment, further use can be made of aggregated baseline data. For example, the baseline data may have a metric such as runtime between measuring points or general instruction counting such that desired ICs may be determined long after baseline data is produced. In an embodiment a combination of counts for both AR and MV may be extracted from the general baseline data described above (which had individual counts for AR and MV but never gave a count for the combination of AR and MV). Any number of metrics may be determined from aggregated data even if the baseline data does not specifically provide for the newly desired data. Thus, an embodiment may extract from the aggregation of data and use a subset of the aggregated data to make it very difficult for an attacker to know what the embodiment is looking for during execution.

While an attacker may be able to circumvent a total IC of 500 instructions, the attacker's task is much more difficult to match up with, for example, only 12 AR instructions. Further, the attacker will not know that that AR type instructions, and not MV type instructions, are the focus of inspection because the focus of inspection may change with each execution run.

Figure 12:
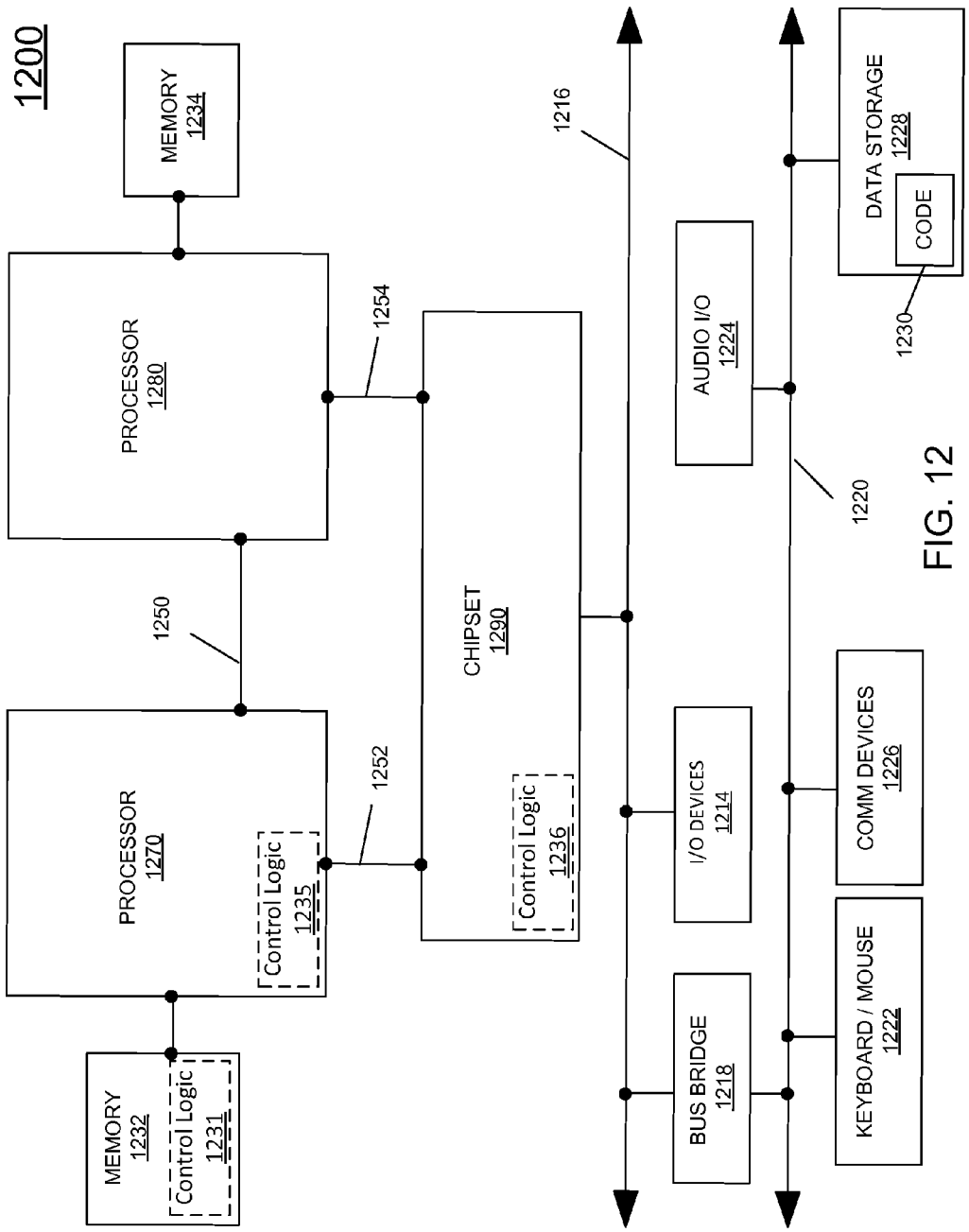
FIG. 12 includes a system for use with embodiments of the invention.

Embodiments may be implemented in many different system types. Referring now to FIG. 12, shown is a block diagram of a system in accordance with an embodiment of the invention which may be found in a desktop, laptop, mobile internet device, mobile computing node, Smartphone, cell phone, radio, fixed computing node, and the like. Multiprocessor system 1200 is a point-to-point interconnect system, and includes a first processor 1270 and a second processor 1280 coupled via a point-to-point interconnect 1250. Each of processors 1270 and 1280 may be multicore processors. The term "processor" may refer to any device or portion of a device that processes electronic data from registers and/or memory to transform that electronic data into other electronic data that may be stored in registers and/or memory. First processor 1270 may include a memory controller hub (MCH) and point-to-point (P-P) interfaces. Similarly, second processor 1280 may include a MCH and P-P interfaces. The MCHs may couple the processors to respective memories, namely memory 1232 and memory 1234, which may be portions of main memory (e.g., a dynamic random access memory (DRAM)) locally attached to the respective processors. First processor 1270 and second processor 1280 may be coupled to a chipset 1290 via P-P interconnects, respectively. Chipset 1290 may include P-P interfaces. Furthermore, chipset 1290 may be coupled to first bus 1216 via an interface. Various input/output (I/O) devices 1214 may be coupled to first bus 1216, along with a bus bridge 1218, which couples first bus 1216 to a second bus 1220. Various devices may be coupled to second bus 1220 including, for example, keyboard/mouse 1222, communication devices 1226, and data storage unit 1228 such as a disk drive or other mass storage device, which may include code 1230, in one embodiment. Code may be included in one or more memories including memory 1228, 1232, 1234, memory coupled to system 1200 via a network, and the like. Further, an audio I/O 1224 may be coupled to second bus 1220.

Embodiments may be implemented in code and may be stored on at least one storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as DRAMs, static random access memories (SRAMs), erasable programmable read-only memories (EPROMs), flash memories, electrically erasable programmable read-only memories (EEPROMs), magnetic or optical cards, or any other type of media suitable for storing electronic instructions.

Embodiments of the invention may be described herein with reference to data such as instructions, functions, procedures, data structures, application programs, configuration settings, code, and the like. Such instructions are included in, for example, FIGS. 3-10 and 14-16 and may be stored in (or distributed across) various locations such as locations 1232, 1231, 1235, 1236, 1230, and/or 1228, and the like. When the data is accessed by a machine, the machine may respond by performing tasks, defining abstract data types, establishing low-level hardware contexts, and/or performing other operations, as described in greater detail herein. The data may be stored in volatile and/or non-volatile data storage. The terms "code" or "program" covers a broad range of components and constructs, including applications, drivers, processes, routines, methods, modules, and subprograms and may refer to any collection of instructions which, when executed by a processing system, performs a desired operation or operations. In addition, alternative embodiments may include processes that use fewer than all of the disclosed operations, processes that use additional operations, processes that use the same operations in a different sequence, and processes in which the individual operations disclosed herein are combined, subdivided, or otherwise altered.

In one embodiment, use of the term control logic includes hardware, such as transistors, registers, or other hardware, such as programmable logic devices (1235). However, in another embodiment, logic also includes software or code (1231). Such logic may be integrated with hardware, such as firmware or micro-code (1236). A processor or controller may include control logic intended to represent any of a wide variety of control logic known in the art and, as such, may well be implemented as a microprocessor, a micro-controller, a field-programmable gate array (FPGA), application specific integrated circuit (ASIC), programmable logic device (PLD) and the like.

At times terms and principles such as SVEN, OMAR, and the like are used for purposes of explanation but embodiments are not limited to using SVEN, OMAR or any other technique or system. Assertions and traces may be implemented using various software and hardware debug tools such as, without limitation, System Trace Protocol (STP) from Mobile Industry Processor Interface (MIPI) (www*mipi*org) and other debug interfaces defined by MIPI. Also, the term "application" should be interpreted broadly to include user applications, operating systems, drivers, as well as many other forms of software, code, and programs as those terms are defined above. Also, the term "provider" is used above but embodiments of the invention are not limited to any one party. Further, at times above embodiments are said to include an application that compares the baseline and real-time trace values. The comparator that compares the traces need not be in any specific location and may be located in, for example, the target application (e.g., 103) or outside of the target application by a completely separate process.

An embodiment includes at least one machine readable medium comprising instructions that when executed on a computing device cause the computing device to perform a method comprising: loading executable instructions, which include instructions having first and second instruction types, into at least one memory coupled to at least one processor; determining whether the executable instructions correspond to general baseline information that includes: (1) first baseline information corresponding to the first instruction type but not the second instruction type, and (2) second baseline information corresponding to the second instruction type but not the first instruction type; loading at least one of the first and second baseline information in response to determining the executable instructions correspond to the general baseline information; executing the executable instructions, including executing the instructions having first and second instruction types, to determine first real time information that corresponds to the first baseline information but not the second baseline information; and determining a variance between the first baseline information and the first real time information. In an embodiment the method includes comparing the first baseline information to the first real time information to determine the variance. In an embodiment the method includes discontinuing execution of the executable instructions, based on the variance, before the executable instructions are completely executed. In an embodiment discontinuing execution of the executable instructions includes issuing a hardware interrupt based on the variance. In an embodiment determining whether the executable instructions correspond to the general baseline information includes determining whether the executable instructions are linked to the general baseline information. In an embodiment the first baseline information includes a first instruction count corresponding to the first instruction type and the second baseline information includes a second instruction count corresponding to the second instruction type. In an embodiment the first real time information includes a first real time instruction count corresponding to the first instruction type and not the second instruction type; and the variance is based on a difference between the first instruction count and the first real time instruction count. In an embodiment the first instruction count corresponds to how many times instructions having the first instruction type have executed. In an embodiment the method determines no second real time information that corresponds to the second baseline information but not the first baseline information. In an embodiment the general baseline information includes a baseline instruction count differential between two locations within the executable instructions. In an embodiment the method includes executing the executable instructions to determine additional real time information that includes a real time instruction count differential between the two locations. In an embodiment the method includes determining an additional variance between the baseline instruction count differential and the real time instruction count differential. In an embodiment the method includes randomly selecting only one of: (a) determining the first real time information, and (b) determining second real time information, the second real time information corresponding to the second baseline information but not the first baseline information. In an embodiment the method includes: for a first execution of executable instructions randomly selecting only one of: (a) determining the first real time information, and (b) determining second real time information, the second real time information corresponding to the second baseline information but not the first baseline information; and for a second execution of the executable instructions, which occurs after the first execution, randomly selecting another of: (a) determining the first real time information, and (b) determining the second real time information.

An embodiment comprises at least one processor, to couple to at least one memory, to perform operations comprising: loading executable instructions, which include instructions having first and second instruction types, into the at least one memory; loading at least one of first and second baseline information, the first baseline information corresponding to a first instruction type but not a second instruction type, and the second baseline information corresponding to the second instruction type but not the first instruction type; executing the instructions having first and second instruction types to determine first real time information that corresponds to the first baseline information but not the second baseline information; and determining a variance between the first baseline information and the first real time information. In an embodiment the first baseline information includes a first instruction count corresponding to the first instruction type and the second baseline information includes a second instruction count corresponding to the second instruction type. In an embodiment the first real time information includes a first real time instruction count corresponding to the first instruction type and not the second instruction type; and the variance is based on a difference between the first instruction count and the first real time instruction count. In an embodiment the method determines no second real time information that corresponds to the second baseline information but not the first baseline information.

An embodiment includes at least one machine readable medium comprising instructions that when executed on a computing device cause the computing device to perform a method comprising: loading executable instructions, which include instructions having first and second instruction types, into the at least one memory; loading at least one of first and second baseline information, the first baseline information corresponding to a first instruction type but not a second instruction type, and the second baseline information corresponding to the second instruction type but not the first instruction type; executing the instructions having first and second instruction types to determine first real time information that corresponds to the first baseline information but not the second baseline information; and determining a variance between the first baseline information and the first real time information. In an embodiment the first baseline information includes a first instruction count corresponding to the first instruction type and the second baseline information includes a second instruction count corresponding to the second instruction type. In an embodiment the first real time information includes a first real time instruction count corresponding to the first instruction type and not the second instruction type; and the variance is based on a difference between the first instruction count and the first real time instruction count. In an embodiment the method determines no second real time information that corresponds to the second baseline information but not the first baseline information.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All optional features of apparatus(s) described above may also be implemented with respect to method(s) or process(es) described herein. While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. At least one non-transitory machine readable medium comprising instructions that when executed on a computing device cause the computing device to perform a method comprising:
   loading executable instructions, which include instructions having first and second instruction types, into at least one memory coupled to at least one processor;
   determining whether the executable instructions correspond to general baseline information that includes: (a) first baseline information corresponding to the first instruction type but not the second instruction type, and (b) second baseline information corresponding to the second instruction type but not the first instruction type;
   loading at least one of the first and second baseline information in response to determining the executable instructions correspond to the general baseline information;
   executing at least a portion of the executable instructions, including executing the instructions having first and second instruction types, to determine first real time information that corresponds to the first baseline information but not the second baseline information;
   determining a variance between the first baseline information and the first real time information; and
   randomly selecting only one of: (a) determining the first real time information, and (b) determining second real time information, the second real time information corresponding to the second baseline information but not the first baseline information;
   wherein the general baseline information includes a baseline instruction count differential between two locations within the executable instructions.

2. The at least one medium of claim 1, the method including comparing the first baseline information to the first real time information to determine the variance.

3. The at least one medium of claim 1, the method including discontinuing execution of the executable instructions, based on the variance, before the executable instructions are completely executed.

4. The at least one medium of claim 3, wherein discontinuing execution of the executable instructions includes issuing a hardware interrupt based on the variance.

5. The at least one medium of claim 1, wherein determining whether the executable instructions correspond to the general baseline information includes determining whether the executable instructions are linked to the general baseline information.

6. The at least one medium of claim 1, wherein the first baseline information includes a first instruction count corresponding to the first instruction type and the second baseline information includes a second instruction count corresponding to the second instruction type.

7. The at least one medium of claim 6, wherein:
the first real time information includes a first real time instruction count corresponding to the first instruction type and not the second instruction type; and
the variance is based on a difference between the first instruction count and the first real time instruction count.

8. The at least one medium of claim 6, wherein the first instruction count corresponds to how many times instructions having the first instruction type have executed.

9. The at least one medium of claim 1, the method including executing the executable instructions to determine additional real time information that includes a real time instruction count differential between the two locations.

10. The at least one medium of claim 9, the method including determining an additional variance between the baseline instruction count differential and the real time instruction count differential.

11. The at least one medium of claim 1, the method including:
for a first execution of executable instructions randomly selecting the only one of: (a) determining the first real time information, and (b) determining the second real time information; and
for a second execution of the executable instructions, which occurs after the first execution, randomly selecting another of: (a) determining the first real time information, and (b) determining the second real time information.

12. An apparatus comprising:
at least one processor, to couple to at least one memory, to perform operations comprising:
loading executable instructions, which include instructions having first and second instruction types, into the at least one memory;
loading at least one of first or second baseline information, the first baseline information corresponding to a first instruction type but not a second instruction type, and the second baseline information corresponding to the second instruction type but not the first instruction type;
executing the instructions having first and second instruction types to determine first real time information that corresponds to the first baseline information but not the second baseline information;
determining a variance between the first baseline information and the first real time information; and
randomly selecting only one of: (a) determining the first real time information, and (b) determining second real time information, the second real time information corresponding to the second baseline information but not the first baseline information;
wherein (c) the first baseline information includes a first instruction count corresponding to the first instruction type and the second baseline information includes a second instruction count corresponding to the second instruction type; (d) the first real time information includes a first real time instruction count corresponding to the first instruction type and not the second instruction type; and (e) the variance is based on a difference between the first instruction count and the first real time instruction count.

13. At least non-transitory one machine readable medium comprising instructions that when executed on a computing device cause the computing device to perform a method comprising:
loading executable instructions, which include instructions having first and second instruction types, into at least one memory;
loading at least one of first and second baseline information, the first baseline information corresponding to a first instruction type but not a second instruction type, and the second baseline information corresponding to the second instruction type but not the first instruction type;
executing the instructions having first and second instruction types to determine first real time information that corresponds to the first baseline information but not the second baseline information;
determining a variance between the first baseline information and the first real time information; and
randomly selecting only one of: (a) determining the first real time information, and (b) determining second real time information, the second real time information corresponding to the second baseline information but not the first baseline information;
wherein (c) the first baseline information includes a first instruction count corresponding to the first instruction type and the second baseline information includes a second instruction count corresponding to the second instruction type; (d) the first real time information includes a first real time instruction count corresponding to the first instruction type and not the second instruction type; and (e) the variance is based on a difference between the first instruction count and the first real time instruction count.

14. The at least one medium of claim 13, wherein the method does not determine the second real time information.

15. A method executed by at least one processor comprising:
loading executable instructions, which include instructions having first and second instruction types, into at least one memory coupled to at least one processor;
determining whether the executable instructions correspond to general baseline information that includes: (a) first baseline information corresponding to the first instruction type but not the second instruction type, and (b) second baseline information corresponding to the second instruction type but not the first instruction type;
loading at least one of the first and second baseline information in response to determining the executable instructions correspond to the general baseline information;
executing at least a portion of the executable instructions, including executing the instructions having first and second instruction types, to determine first real time information that corresponds to the first baseline information but not the second baseline information;

determining a variance between the first baseline information and the first real time information; and randomly selecting only one of: (a) determining the first real time information, and (b) determining second real time information, the second real time information corresponding to the second baseline information but not the first baseline information;

wherein the general baseline information includes a baseline instruction count differential between two locations within the executable instructions.

16. The method of claim 15 including comparing the first baseline information to the first real time information to determine the variance.

* * * * *